(12) United States Patent
Canpont et al.

(10) Patent No.: US 6,391,944 B2
(45) Date of Patent: *May 21, 2002

(54) METHOD FOR PREPARING A SILICA SUSPENSION IN A VULCANISABLE SILICON MATRIX TO FORM ELASTOMERS

(75) Inventors: Dominque Canpont, Oullins; Andre Plantier, Saint-Prim; Alain Pouchelon, Meyzieu, all of (FR)

(73) Assignee: Rhodia Chimie, Courbevoie (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/446,676
(22) PCT Filed: Jun. 23, 1998
(86) PCT No.: PCT/FR98/01319
§ 371 Date: Mar. 24, 2000
§ 102(e) Date: Mar. 24, 2000
(87) PCT Pub. No.: WO98/58997
PCT Pub. Date: Dec. 30, 1998

(30) Foreign Application Priority Data

Jun. 24, 1997 (FR) .............................. 97 08171

(51) Int. Cl.$^7$ ................................. C08K 9/06
(52) U.S. Cl. ................ 523/212; 523/213; 524/588
(58) Field of Search ................ 523/212, 213; 524/588

(56) References Cited

U.S. PATENT DOCUMENTS

| | | | |
|---|---|---|---|
| 4,585,830 A | | 4/1986 | Sweet .................. 524/862 |
| 4,785,047 A | | 11/1988 | Jensen .................. 524/714 |
| 5,013,772 A | * | 5/1991 | Fujiki et al. .............. 523/213 |
| 5,486,551 A | * | 1/1996 | Polmanteer .............. 523/212 |
| 5,674,935 A | * | 10/1997 | Evans et al. .............. 524/588 |
| 5,688,840 A | * | 11/1997 | Ono ....................... 523/209 |

FOREIGN PATENT DOCUMENTS

| | | |
|---|---|---|
| EP | 0 462 032 | 3/1987 |
| EP | 0 669 376 | 8/1995 |
| FR | 2 320 324 | 5/1994 |

* cited by examiner

Primary Examiner—Margaret G. Moore
(74) Attorney, Agent, or Firm—Burns, Doane, Swecker & Mathis, L.L.P.

(57) ABSTRACT

The invention concerns the preparation of a silica suspension in a silicon fluid, said suspension being used to produce silicon vulcanizable by polyaddition (RTV elastomers). The problem which the invention aims to solve is that of finding a technical compromise between the rheological and mechanical properties of the final RTV. The invention solves the problem by providing a method for preparing a silica suspension treated with hexamethyldisilazane (HMDZ) in a silicon fluid with siloxyl Si-Vinyl function, characterised in that it consists essentially in introducing HMDZ in the preparation medium, before and/or substantially while bringing at least part of the silicon fluid prepared with at least part of the particulate filler used, said introduction being carried out once or several times for a HMDZ fraction corresponding to a proportion not more than 8% by dry weight with respect to the total silica charge and after bringing together the POS and the filler.

5 Claims, No Drawings

METHOD FOR PREPARING A SILICA SUSPENSION IN A VULCANISABLE SILICON MATRIX TO FORM ELASTOMERS

This application was a national stage filing under 35 U.S.C. §371 of International Application No. PCT/FR98/01319 filed on Jun. 23, 1998, which International Application was published by the International Bureau in English on Dec. 30, 1998.

TECHNICAL FIELD

The field of the invention is that of silicone elastomers which can be obtained by polyaddition and the main components of which are silicone polymers and fillers.

More specifically, the present invention relates to the preparation of an intermediate product useful for obtaining these silicone elastomers and consisting of a suspension of a reinforcing filler in a polyorganosiloxane carrying Si-alkenyl—preferably Si-Vi—functional groups capable of reacting by polyaddition with the SiH crosslinking functional groups of another POS.

PRIOR ART

A distinction may be made between reinforcing and non-reinforcing fillers in silicone rubbers.

The most widely used reinforcing fillers are preferably pyrogenic silicas having a BET surface area >50 m$^2$/g. They owe their reinforcing effect firstly to their morphology and secondly to the hydrogen bonds which form between the silanol groups on the surface of the silicas (3–4.5 SiOH groups/mm 2) and the polyorganosiloxane (POS) chains. These interactions between the filler and the polymer increase the viscosity and modify the behaviour of the polymer near the solid surface of the fillers. Moreover, the bonds between polymers and fillers improve the mechanical properties but may also cause prejudicial premature curing ("structuring") of the precursor compositions of the elastomers.

Non-reinforcing fillers interact extremely weakly with the silicone polymer. These are, for example, chalk, quartz powder, diatomaceous earth, mica, kaolin, aluminas or iron oxides. Their effect is often to increase the viscosity of the uncured precursors of the elastomers, as well as the Shore hardness and the modulus of elasticity of these precursors.

Silicone elastomers may also contain, inter alia, catalysts, inhibitors, crosslinking agents, pigments, antiblocking agents, plasticizers and adhesion promoters.

These elastomers, curable by polyaddition and also called RTV elastomers, are formed, before curing, by casting, extrusion, calendering, or compression, injection or transfer moulding.

Silicone compositions made of elastomers, which can be cured by polyaddition at room temperature or at higher temperatures (generally <200° C.), are conventionally packaged in the form of two-component systems, that is to say comprising two parts which are packaged separately and have to be mixed at the time of use. In two-component systems, one of the components comprises the catalyst for the polyaddition reaction. This catalyst is preferably of the platinum kind. It may, for example, be a platinum complex like the one prepared from chloroplatinic acid and 1,3-divinyl-1,1,3,3-tetramethyldisiloxane, according to U.S. Pat. No. 3,814,730 (Karstedt catalyst). Other platinum complexes are described in Patents U.S. Pat. Nos. 3,159,601, 3,159,662 and 3,220,972. This component including the catalyst may also comprise only one of the POS fluids of type I having Si-alkenyl, preferably Si-vinyl, crosslinking functional groups or only one of the POS fluids of type II having an SiH crosslinking functional group. Generally, the POS fluids of type I and the POS fluids of type II comprise at least two Si-Vi and SiH groups per molecule, respectively, preferably in the α and ω positions on the chain: at least one of the two having to comprise at least three crosslinking functional groups per molecule. These compositions comprise, in a known manner, POS fluids of type I and II, a platinum catalyst for crosslinking by polyaddition and a platinum inhibitor allowing the compositions to cure only once they have been removed from the package and mixed together, optionally after they have been heated slightly. As examples of inhibitors, mention may be made of:

- polyorganosiloxanes, advantageously cyclic polyorganosiloxanes, substituted with at least one alkenyl, tetramethylvinyltetrasiloxane being particularly preferred,
- pyridine,
- organic phosphines and phosphites,
- unsaturated amides,
- alkylated maleates
- and acetylenic alcohols (cf. FR-B-1,528,464 and FR-A-2,372,874).

Such compositions may also be in the form of one-component systems which cure only after having been heated.

The preparation of concentrated suspensions (pastes) of reinforcing silicas in vinyl silicone oils, these suspensions being intended to produce elastomers that can be cured by the reaction of a polyhydrogenated crosslinking molecule such as a POS with the vinyl silicone oil (SiH/SiVi addition), is widespread in the field of elastomers.

The commonest reinforcing particulate fillers are based on silica, but substances such as TiO$_2$, Al$_2$O$_3$ and kaolin, for example, may also be used in certain cases. These reinforcing fillers have a BET specific surface area of at least 50 m$^2$/g, and generally up to 400 m$^2$/g. These are ultrafine powders which may be dispersed in silicone, preferably SiVi, oils. This dispersion causes problems when mixing some of the pulverulent filler with the oil and particular care must be taken in order to obtain a uniform distribution of the fillers in the suspension.

Another difficulty to be overcome is associated with the rheology of the suspensions prepared. This is because it is clear that introducing a pulverulent particulate filler of very small particle size into the silicone oil necessarily causes an appreciable increase in the viscosity. However, this characteristic, although it accompanies the achievement of good mechanical properties for the silicon elastomers comprising the suspension as raw material, is prejudicial to the handling and forming of the suspension and of the silicone compositions containing the suspension. It is in fact more convenient, for moulding, extrusion or forming, to handle fluid compositions which readily lend themselves, inter alia, to pumping, flowing or mixing with functional additives.

The problematic considered here may therefore be summarized as how to find a technical compromise between a priori antinomic specifications for the suspensions of fine particulate fillers in silicone oils, namely: fine distribution of particles in the silicone matrix—uniformity of the dispersion—suitability of the rheology of the suspension to the handling constraints (processibility)—mechanical properties of the RTV silicone elastomers.

French Patent Application No. 2,320,324 falls within this problematic and describes a process for a homogeneous distribution in polyorganosiloxanes of a highly disperse active filler of BET specific surface area of at least 50 m$^2$/g, this process being characterized in that the filler is treated during incorporation, in the presence of water, by a modifier or compatibilizer of the silazane type, hexamethyldisilazane being particularly preferred. The other compatibilizers mentioned are trimethylsilane, trimethylchlorosilane, trimethylethoxysilane, triorganosilyl mercaptans, triorganosilyl acylates or triorganosilyl amines. According to this process, described in this prior application, an α,ω-trimethylsiloxy polydimethylsiloxane with hexamethyldisilazane (HMDZ) and with water. Once this mixture has been homogenized, some particulate silica is incorporated into it and mixing is continued until a homogeneous mixture is obtained. Next, the mixture is heated to 130° C. in order to remove the excess HMDZ and water by devolatilization. It is left to cool and, after measuring the viscosity of the suspension obtained, it is found that the latter is relatively high, which, of course, gives the elastomers capable of being prepared from this suspension good mechanical properties, but which proves to be unacceptable from a handling standpoint in an industrial context. This compatibilization treatment of the silica with the silicone oil may be termed "early" since the HMDZ is present as soon as the reinforcing silica is brought into contact with this silicone oil. The compatibilization treatment is a means of retarding or preventing reaction between the surface of a reinforcing filler and a siloxane polymer. This interaction causes what is called structuring and as a result the conversion of these mixtures is more difficult.

Processes for preparing a suspension of reinforcing silica in silicone oils are also known, in which the compatibilization treatment with the aid of hexamethyldisilazane is carried out after the silica has been incorporated into the silicone oil. This method of treatment is termed here "late". It provides relatively fluid suspensions which may have a tendency to structure over time. In certain cases, the suspensions formed may have a certain tendency to be thixotropic. This is not without having undesirable consequences when converting and handling these suspensions, especially when degassing them. Nevertheless, it may be stated that, whatever the rheological properties of the suspensions obtained by late HMDZ treatment, the final mechanical properties of the elastomers prepared from the said suspensions are perfectible (hardness, tensile strength, elongation at break, tear strength). In particular, they do not reach the level of those found in the case of early treatment.

By way of illustration of this type of compatibilization treatment, mention may be made of European Patent Application No. 0,462,032 which describes a process for preparing a paste which can be used especially in compositions that are curable by a polyaddition reaction and which thus allows silicone elastomers to be obtained. According to this process, the following are injected, continuously and simultaneously, into a twin-screw extruder, at at least four different points:

at least one SiVi POS oil,
water,
silica,
a liquid polysilazane under normal temperature and pressure conditions (HMDZ).

The silica is injected downstream of the water and of the oil and upstream of the HMDZ without, however, there being any mixing, between the HMDZ and water on the one hand and between the HMDZ and the silica on the other, before introduction of HMDZ.

U.S. Pat. No. 4,785,047 discloses a hybrid compatibilization treatment, at the boundary between the early and late treatments mentioned above. This patent relates more specifically to a process for preparing transparent silicone elastomers. This document describes pumpable liquid compositions formed from suspensions of HMDZ-treated siliceous filler in silicone oils which may or may not carry polyaddition-crosslinking functional groups (SiH/SiVi). The problematic presented in this patent is different from that of the prior art presented above. In this case it is in fact more one of obtaining transparent elastomers and, in order to do so, of trying to counteract the deleterious effect of the siliceous filler on the transparency by a very substantial HMDZ treatment. According to the process forming the subject of that patent, part of the silicone oil is firstly mixed with all of the water and all of the silica, but only with a fraction of the HMDZ representing systematically more than 15% by dry weight with respect to the silica, namely 34% and 26% in the examples. After this first mixture has been homogenized, the remaining HMDZ is incorporated and mixed into the latter. Next, the devolatilization treatment is carried out for 1 hour at 150° C. and under reduced pressure. Finally, the rest of the PMDS silicone oil and the α, ω-diVi PDMS silicone oil are mixed for 1 hour at room temperature. The transparent curable silicone suspension obtained has a viscosity lying between 200 and 10,000 Pa.s at 25° C. This technical proposal may possibly provide a solution to the transparency problem, but it proves to be unsatisfactory with regard to the viscosity of the suspension and to its handling.

BRIEF SUMMARY OF THE INVENTION

In such a technical context, one of the essential objectives of the present invention is to provide a process for preparing a suspension of a particulate filler, treated with the aid of a compatibilizer, in a silicone oil, this suspension being able to be used as a raw material for the production of RTV elastomer compositions that can be cured by poplyaddition.

This process has to meet the following specification:
the distribution of the filler in the silicone oil must be uniform and homogeneous,
the dispersion must be optimal,
the suspension must flow well (no flow threshold) and the viscosity must be suitable for handling and converting the suspension,
the mechanical properties of the elastomers must be of an acceptable level.

Another essential objective of the invention is to provide a process for preparing a reinforcing filler/silicone oil suspension for RTV elastomers which is simple to employ, inexpensive and able to be applied on an industrial scale.

Another essential objective of the invention is to provide a process for obtaining a silicone composition, curable by polyaddition in order to form an RTV elastomer and comprising, as a constituent element, the suspension as obtained by the intended process above.

These objectives, among others, are achieved by the present invention which relates to a process for preparing a suspension of a particulate, preferably siliceous, filler in a material formed by a silicone oil comprising:

polyorganosiloxanes (POS fluids) of type (I) which carry Si-alkenyl—preferably Si-vinyl—functional groups capable of reacting with the Si—H crosslinking functional groups of a POS fluid of type II,
optionally, POS fluids of type (II) which carry Si—H crosslinking functional groups capable of reacting with the Si-alkenyl functional groups of the POS fluids (I),
and/or, optionally, POS fluids of type (III) which differ from the POS fluids (I) and (II), the said suspension being able to be used, in particular, for producing silicone compositions that can be cured by polyaddition, this process being of the kind of those in which the particulate filler is treated with the aid of a compatibilizing agent or compatibilizer (CA), characterized in that it essentially consists in introducing some compatibilizer (CA) into the preparation mixture:

on the one hand, before and/or substantially simultaneously with the contacting of at least part of the silicone oil employed with at least part of the particulate filler used, this CA introduction taking place in one or more steps for a CA fraction corresponding to a proportion of at most 8%, preferably at most 5% and even more preferably at most 3% by dry weight with respect to the total particulate filler;

and, on the other hand, after this POS/filler contacting.

It is to the credit of the inventors that they have demonstrated, after extensive research and many experiments, that it is surprisingly and unexpectedly appropriate to incorporate the compatibilizer (for example HMDZ) before and after the reinforcing, preferably siliceous filler has been mixed with the silicone oil, (preferably of SiVi type (I)), as long as the fraction of compatibilizer CA introduced before POS/filler mixing corresponds to less than 5% by weight of the total reinforcing filler.

These novel and advantageous provisions make it possible to obtain suspensions having suitable rheological properties and suitable viscoelastic behaviour. This is because these suspensions do not have a flow threshold, or have a very low threshold which is not prejudicial to the applications. This considerably improves their processing. In particular, they have a fluidity which is stable over time and suitable for the handling and conversion operations, such as pumping, transferring, mixing, forming, moulding, extrusion, etc.

One of the major advantages of the invention is that this attainment from the rheology standpoint is not to the detriment of the final mechanical properties of the crosslinked elastomer. The technical compromise is achieved.

Moreover, the methodology adopted makes it possible to obtain good homogeneous dispersions of the particulate filler in the oil. In addition, this methodology does not significantly complicate the process, which remains simple and inexpensive to implement.

DETAILED DESCRIPTION OF THE INVENTION

In accordance with one of these preferred methods of implementation, the process according to the invention essentially consists:

in mixing:
  100 parts by weight of silicone oil
  0 to 5 parts by weight of water
  20 to 80 parts by weight of particulate filler consisting of silica
  1 to 20 parts by weight of compatibilizer (CA) selected from silazanes taken by themselves alone or as a mixture thereof, preferably from disilazanes, hexamethyldisilazane which may or may not be combined with divinyltetra-methyldisilazane being particularly preferred;

in leaving the above to react, preferably with stirring, in heating the mixture obtained, choosing a pressure/temperature pair so that at least some of the water and of the volatile elements undergoes devolatilization;

if necessary, in cooling the mixture.

In other words, the process according to the invention makes it possible to control the viscosity of the suspension while at the same time maintaining the mechanical properties of the final elastomer obtained from the suspension at an acceptable level, or even improving this level.

The mixing is carried out with the aid of known and suitable devices. These may be, for example:

arm mixers internal mixers planetary mixers ploughshare mixers corotating or counterrotating twin-shaft mixers continuous extruder-mixers or other continuous or batch devices.

The mixing operation is carried out at normal temperature and pressure and preferably in an inert atmosphere ($N_2$). Moreover, under these conditions the silicone oil, the water but also the compatibilizer are in liquid form in order to make the mixing easy.

The reinforcing, preferably siliceous, filler represents from 10 to 50% by weight of the suspension. In practice, this filler is of the order of 30±10%.

Advantageously, the proportion of compatibilizer introduced in a first step is at most equal to 8% of the reinforcing filler (and, for example, between 1 and 3% of the reinforcing filler, preferably between 1 and 2%). Moreover, it may be pointed out that the total amount of compatibilizer CA is preferably between 5 and 30% of the siliceous filler, preferably between 10 and 20%.

The proportions of compatibilizer AC introduced before and after filler/oil mixing are (5–25), preferably (10–20%), respectively.

In order to define more precisely the preferred method of implementing the process according to the invention, without however this being limiting, it may be pointed out that the process comprises the following steps:

all or some of the silicone oil, the water and all or some of the particulate siliceous filler are mixed with a first CA fraction of between 1 and 3% by dry weight with respect to the silica, a second CA fraction, representing between 10 and 15% by dry weight of silica, is incorporated into the mixture, optionally, the rest of the silicone oil and the rest of the silica are added, the mixture is allowed to react, preferably by continuing the mixing, the mixture is devolatilized, preferably in an inert-gas atmosphere (eg. $N_2$), optionally, the devolatilized mixture is allowed to cool and, optionally, the suspension is completed with the rest of the silicone oil.

According to a first particular practical implementation of the process of the invention, it comprises the following steps:

1. a mixture comprising the silicone oil, the water and the first CA—preferably HMDZ—fraction is homogenized,
2. the particulate filler, preferably silica, is gradually added to the mixture obtained at 1,
3. the mixing is continued,
4. the second CA—preferably HMDZ—fraction is gradually incorporated into the mixture obtained at 3, 5. the mixing is continued,
6. the mixture is devolatilized, preferably by heating to a temperature $\geq 100°$ C.

In step 1 of this first practical implementation, a choice is made between, inter alia, the following three alternatives:
a) either all the oil and all the silica, as well as the initial CA fraction, are used,
b) or all the oil, part of the silica and the initial CA fraction are used,
c) or all the silica, part of the oil and the initial CA fraction are used.

According to a second particular practical implementation of the invention, it comprises the following steps:
1'. the silicone oil and the water are homogenized,
2'. the particulate filler—preferably silica—and, at the same time, the first CA—preferably HMDZ—fraction are gradually incorporated into the mixture obtained at 1,
3. the mixing is continued,
4. the second CA—preferably HMDZ—fraction is gradually incorporated into the mixture obtained at 3,
5. the mixing is continued,
6. the mixture is devolatilized, preferably by heating to a temperature $\geq 100°$ C.

The characteristic of this second method is associated with the fact that the process involves the co-addition of the particulate reinforcing filler and its compatibilizer. It is therefore conceivable to make a preblend of these two constituents, or, alternatively, to introduce them concomitantly. The gradual incorporation in step 2'may be carried out continuously or in stages.

According to a variant of this second practical method of implementation,
1". the silicone oil is introduced,
2". the particulate filler—preferably silica—together with the first CA—preferably HMDZ—fraction and the water are gradually and simultaneously incorporated into the oil,
3. the mixing is continued,
4. the second CA—preferably HMDZ—fraction is gradually incorporated into the mixture obtained at 3,
5. the mixing is continued,
6. the mixture is devolatilized, preferably by heating to a temperature $\geq 100°$ C.

According to one advantageous provision of the invention, corresponding to the case in which the reinforcing filler is silica and the compatibilizer CA is HMDZ, a sufficient amount of HMDZ is used for the content of $Si(Me)_3$ units on the surface of the silica to be $\geq 1$ $Si(Me)_3$ unit per $mm^2$ and preferably between 1 and 2 $Si(Me)_3$ units per $mm^2$.

According to a third method of implementing the invention, the process to which it relates is characterized:
in that the first CA fraction is replaced, completely or partly, with at least one processing aid chosen from molecules and combinations of molecules:
capable of interacting with the particulate filler, particularly with silicon if a siliceous filler is used, to the detriment of the hydrogen bonds that this particulate filler establishes especially between its own atoms and/or with those of the silicone oil,
and capable of being removed from the preparation mixture by devolatilization,
and in that actions are taken to ensure that this processing aid is in the presence of water in the preparation mixture.

In accordance with this third method of implementation, it is preferable for the processing aid to be readily removable from the preparation mixture. For this purpose, it is beneficial for it to be easily removed by devolatilization, for example by heating in a vacuum or in a gas stream. Under these conditions, it clear that, as processing aid, molecules of low molecular weight will be preferred.

Advantageously, the processing aid is chosen from the group comprising:
silazanes, HMDZ being preferred;
difunctional, or preferably monofunctional, hydroxylated siloxanes;
amines, preferably ammonia and/or alkylamines, diethylamine being particularly preferred;
organic acids, formic and/or acetic acids being preferred;
and mixtures thereof.

As indicated above, the products more particularly selected as processing aids are those having a low molecular weight. This proves to be the case especially for the amines and the organic acids mentioned above.

With regard to the products employed in the process according to the invention, it may be pointed out that, in the case of the silicone oil, linear or cyclic, but more especially linear, polydiorganosiloxanes will preferably be chosen.

With regard to the POS fluids (I), these will be polydiorganosiloxane oils carrying an Si-alkenyl, particularly an Si-vinyl, group in and/or at the ends of the chain. In practice, mention may be made, for example, of $\alpha,\omega$-divinyl-terminated polydialkyl (methyl) siloxanes. Preferably, the POS (I) used for preparing the suspension is a vinyl POS (I) carrying at least two SiVi units per molecule, preferably at least three per molecule, when the POS (II) contains only two SiH units per molecule.

As regards the POS (II), this is chosen from polyorganohydrogenosiloxanes comprising at least two SiH units per molecule, preferably at least three, when the POS (I) comprises only two SiVi units per molecule. In practice, mention may be made, for example, of polyalkyl(methyl) hydrogenosiloxanes or else branched hydrogenated POS fluids having trifunctional or tetrafunctional units and units carrying SiH.

The POS (III) may be a polydiorganosiloxane such as a polyalkylsiloxane, preferably a polydimethylsiloxane, having trimethylsilyl end groups.

The preferred silicone oils (I, II, III) essentially comprise $R_2SiO$ units, the symbols R, which may be identical or different, representing $C_{1-C4}$ (cyclo)alkyls which may or may not be halogenated, or aryl groups, which may or may not be substituted or halogenated.

By way of groups:
alkyl: mention may especially be made of methyl, ethyl, propyl and butyl groups,
haloalkyl: mention may be made of 3,3-trifluoropropyl,
cycloalkyl: mention may be made of cyclohexyl,
aryl: mention may be made of the phenyl group.

Preferably, at least 85% of the groups R represent methyl groups.

The silica used in the process according to the present invention is a reinforcing silica whose specific surface area is preferably between 50 and 400 $m^2/g$. These silicas may be precipitated silicas, but more generally fumed silicas are employed. The fact that silica is preferred does not exclude making use of other types of known reinforcing filler.

The CA is preferably a silazane and even more preferably a disilazane. This is a product which is liquid under standard temperature and pressure conditions (23° C./760 mmHg).

The viscosity of the suspension is one of the key parameters which govern the process according to the invention. Thus, in accordance with one advantageous provision of the latter:

alkenylated—preferably vinylated—silicone oil comprising at least two Si-alkenyl groups per molecule, each preferably located at one end of the chain, and having a dynamic viscosity at 25° C. not exceeding 250 Pa.s, preferably not exceeding 100 Pa.s and more preferably still not exceeding 10 Pa.s, is employed, a silica having a BET specific surface area of between 50 and 400 m$^2$/g and mixing conditions such that the dynamic viscosity at 25° C. of the suspension does not exceed 300 Pa.s, preferably does not exceed 250 Pa.s and more preferably still does not exceed 200 Pa.s, are chosen.

INDUSTRIAL APPLICATION

The purpose of the reinforcing filler/silicone oil suspension prepared in accordance with the invention is for it to be used for obtaining liquid or pasty silicone compositions made of RTV silicone elastomer, which compositions can be cured, preferably by polyaddition, in the ambient atmosphere and at a normal temperature or at a higher temperature.

Thus, according t o another of these aspects, the present invention relates to a process for obtaining a silicone composition that can be cured by polyaddition, characterized in that it consists in mixing the following products:

A—a suspension as prepared according to the process as defined above,

B—one or more POS fluids (I), as defined above,

C—one or more POS fluids (II), as defined above,

D—optionally, one or more POS fluids (III), as defined above, useful as diluent (s)

E—a catalytic system comprising a catalyst, preferably of the platinum kind, and, optionally, an inhibitor or retarder.

According to a first variant of this process:

the composition is produced in the form of a two-component system comprising parts $C_1$ and $C_2$ which are intended to be brought into contact with each other in order to produce an elastomer crosslinked by polyaddition between the POS fluids (I) and (II), and care is taken to ensure that only one of the parts, $C_1$ or $C_2$, contains some catalyst D and, optionally, one or other of the POS fluids (I) and (II)

According to a second variant of this process for preparing curable liquid compositions, a one-component system is produced which is intended to be crosslinked in the ambient air and/or under the effect of temperature.

These curable compositions, which are precursors of elastomers, may also comprise one or more functional additives F such as, for example, a non-reinforcing filler formed by chalk, quartz powder, diatomaceous earth, mica, kaolin, aluminas or iron oxides. These optional additives F may also consist of pigments, antiblocking agents, plasticizers or rheology modifiers, stabilizers or adhesion promoters.

The examples which follow illustrate:

the preparation of suspensions of reinforcing filler in silicone oils in accordance with the invention, the application of these suspensions as raw material for obtaining two-component curable compositions made of RTV silicone elastomers, and the evaluation of the viscoelastic properties of the suspensions and the mechanical properties of the crosslinked elastomers obtained from the said suspensions.

Two methods of implementing the process of the invention are given in the examples. The latter also comprise comparative examples for preparing suspensions accordance with the prior art using compatibilization treatment methods of the "late" type and of the "early" type.

EXAMPLES

Comparative Example 1

Late Treatment

Introduced into a 1.5 l arm mixer are 750 g of α,ω-divinyl-terminated PolyDiMethylSiloxane (PDMS) oil having a viscosity of 0.6 Pa.s and 21 g of water. After homogenization, 321 g of a fumed silica, characterized by its specific surface area of 300 m$^2$/g, are added in portions over 70 minutes. After mixing for 120 minutes, 66 g of hexamethyldisilazane are added over 90 minutes. A heating phase starts 60 minutes later, during which, when the temperature reaches 80° C., the mixture is placed in a stream of nitrogen (250 l/h); the heating continues until reaching approximately 155°, a steady temperature which is maintained for 2 h. After cooling, 43 g of the vinyl-terminated oil are cooled and the suspension homogenized.

Starting from this suspension, a part A and a part B are formulated.

Part A contains:

90.6 g of the suspension;

1.58 g of the α,ω-divinyl-terminated PDMS oil described;

5.48 g of an α,ω-dihydrogeno PDMS oil containing 1.9 meq SiH per gram of oil 2.35 g of a polyhydrogeno PDMS oil having a viscosity of 30 mPa.s, containing 1.6 meq SiH per gram of oil.

Part B contains:

11 g of the suspension;

29 g of the α,ω-divinyl-terminated PDMS oil described above;

9.77 g of an α,ω-divinyl-terminated PDMS oil containing 0.05 meq Vi per gram of oil;

70 μl of a Karstedt catalyst containing 12% platinum;

90 μl of divinyltetramethyldisiloxane;

140 μl of tetravinyltetramethylcyclotetrasiloxane.

Parts A and B are mixed in a ratio of 100 to 10 and, after degassing, 2 mm thick plaques of elastomers are prepared. The mouldings are cured in a ventilated oven for 1 hour at 150° C. The test pieces necessary for measuring the mechanical properties are cut from these plaques of cured elastomer.

Example 2

Early Treatment

The previous example is repeated except that the process starts with the mixer being charged with 750 g of α,ω-divinyl-terminated PDMS oil, 21 g of water and 66 g of hexamethylsisilazane [sic]. After stirring for 10 minutes, the silica is incorporated in portions over 30 minutes; the mixing is continued for a further 120 minutes before starting the heating phase, which is the same as above. The suspension is formulated as in Example 1.

Comparative Properties of the Suspensions and of the Cured Elastomers According to Examples 1 and 2

The viscosity of the suspensions is measured by means of a dynamic rheometer with a cone/plate geometry. The complex viscosity at 1 Hz and at 1 Pa is taken as being representative of the viscoelastic behaviour of the suspensions. The mechanical properties are measured according to the standards in force:

DIN 53505 for the hardness measurement
AFNOR T46002 for the breaking measurements.

|  | Dynamic viscosity Pa.s | Shore A hardness pts | Stress at break MPa | Elongation at break % |
|---|---|---|---|---|
| Example 1 | 13 | 38 | 6.1 | 390 |
| Example 2 | 3000 | 35 | 6.9 | 560 |

In the case of Example 1, the viscosity is low but the breaking properties of the elastomer are moderate. With regard to Example 2, this has better breaking properties, but at the price of having a high viscosity.

Example 3

Two-Step Treatment

Introduced into a 100 l arm mixer are 40 kg of α,ω-divinyl-terminated oil having a viscosity of 2 Pa.s, 0.27 kg of hexamethyldisilazane and 0.27 kg of water. After homogenization, 16.2 kg of a fumed silica characterized by its specific surface area of 200 m$^2$/g are added in portions over 100 minutes. After 60 minutes of mixing, 1.9 kg of hexamethyldisilazane are added over 60 minutes. A heating phase is started 120 minutes later, during which the mixture is placed in a stream of nitrogen (30 m$^3$/h); the heating continues until reaching approximately 140°, a steady temperature which is maintained for 2 h. The suspension is then left to cool.

Starting from this suspension, a part A and a part B are formulated.

Part A contains:
427 g of the suspension;
10 g of a polyvinyl PDMS oil having a viscosity of 0.4 Pa.s, containing 0.11 meq Vi per gram of oil;
25 g of trimethyl-terminated oil having a viscosity of 0.1 Pa.s;
26.5 g of an α,ω-dihydrogeno PDMS oil, containing 1.9 meq SiH per gram of oil;
11.3 g of a polyhydrogeno PDMS oil having a viscosity of 30 mPa.s, containing 1.6 meq SiH per gram of oil.

Part B contains:
180 g of the suspension;
20 g of the methyl-terminated oil described;
250 μl of a Karstedt catalyst containing 12% platinum;
1 ml of tetravinyltetramethylcyclotetrasiloxane.

Parts A and B are mixed in a ratio of 100 to 10 and, after degassing, the test pieces necessary for measuring the mechanical properties are prepared as explained in Comparative Examples 1 and 2.

Example 4

Two-Step Treatment with Coaddition of the Reactants

The previous example is repeated except that the mixer is firstly charged with 40 kg of α,ω-divinyl-terminated PDMS oil and 0.27 kg of water. After stirring for 10 minutes, the silica is incorporated in portions over 120 minutes at the same time as 0.27 kg of hexamethyldisilazane, which is divided according to the portions of silica. After this phase of silica and hexamethyldisilazane coaddition, the process is continued as previously. The suspension is formulated as in Example 3.

Properties of the Suspensions and of the Cured Elastomers According to Examples 3 and 4

The viscosity of the suspensions is measured by means of a dynamic rheometer with a cone/plate geometry. The complex viscosity at 1 Hz and at 1 Pa and the threshold stress, for which the elastic and viscous moduli are equal, are taken as being representative of the viscoelastic behaviour of the suspensions. The mechanical properties are measured according to the standards in force.

|  | Dynamic viscosity Pa.s | Threshold stress Pa | Shore A hardness pts | Tear strength N/mm |
|---|---|---|---|---|
| Example 3 | 165 | 25 | 34 | 21 |
| Example 4 | 150 | 1 | 36 | 18 |

Examples 3 and 4 show that the elastomers prepared from the oil/silica suspensions obtained in accordance with the invention have a rheology with a very low flow threshold and a moderate viscosity. This very favourable Theological behaviour is accompanied by excellent tear strength.

Example 5

Two-Step Treatment by Hexamethyldisilazane
Preparation of the Suspension

Introduced into a 7 l arm mixer are 2120 g of a mixture of α,ω-divinvl-terminated oils having a viscosity of 1.5 Pa.s, 12.6 g of water and 12.6 g of hexamethyldisilazane. After homogenization, 765 g of a fumed silica characterized by its specific surface area of 200 m$^2$/g are added in portions over 110 minutes. Then, 80 g of hexamethyldisilazane are added over 60 minutes. A heating phase starts 120 minutes later, during which, when the temperature reaches 70° C., the mixture is placed under vacuum; the heating continues until reaching approximately 150° C., a steady temperature which is maintained for 1 h. The mixture is then cooled in a stream of nitrogen (≈250 l/h) and the apparatus is drained.

Starting from this suspension, a part A and a part B are formulated.

Part A contains;
946.7 g of the suspension;
42.7 g of an 60,ω-dihydrogeno oil, containing 1.9 meq SiH per gram of oil;
10.7 g of a polyhydrogeno oil, containing 1.6 meq SiH per gram of oil.

Part B contains:
22 g of the suspension;
20 g of an α,ω-divinyl-terminated oil, containing 0.15 meq Vi per gram of oil;
58 g of an α,ω-divinyl-terminated oil, containing 0.05 meq Vi per gram of oil;
140 μl of a Karstedt catalyst containing 10% platinum;
0.15 g of divinyltetramethyldisiloxane;
0.35 g of tetravinyltetramethylcyclotetrasiloxane.

Parts A and B are mixed in a ratio of 100 to 10 and, after degassing, the test pieces necessary for measuring the mechanical properties are prepared.

Example 6

Treatment with an Acid First Step

The previous example is repeated except that the 12.6 g corresponding to the first hexamethyldisilazane portion are replaced with 3.6 g of formic acid. All the other operations are carried out as previously. The suspension is formulated as in Example 5.

Example 7

Treatment with a Base First Step

Example 5 is again repeated, except that the 12.6 g corresponding to the first hexamethyldisilazane portion are replaced with 4.2 g of aqueous ammonia containing 32% ammonia. All the other operations are carried out as previously. The suspension is formulated as in Example 5.

Example 8

Evaluation of the Comparative Properties of the Suspensions of Examples 5 to 7

The viscosity of the suspensions is measured by means of a dynamic rheometer with a cone/plate geometry. The following are taken as being representative of the viscoelastic behaviour of the suspensions:

the complex viscosity and its elastic and viscous components at 1 Hz and at 1 Pa;

the threshold stress for which the elastic and viscous moduli are equal. The mechanical properties are measured according to the standards in Force.

|  | Example 5 | Acid Example 6 | Base Example 7 |
|---|---|---|---|
| Complex viscosity | 41 | 38 | 42 |
| Elasticity factor | 0.68 | 0.65 | 0.73 |
| Flow threshold | <1 | <1 | <1 |
| Shore A hardness | 28 | 35 | 32 |
| Elongation at break | 700 | 400 | 610 |
| Tensile strength | 6.8 | 6.3 | 8.0 |
| Tear strength | 29 | 21 | 23 |

It may readily be seen that the Theological behaviour of the suspensions is, in the three cases, typical of a product which flows well and that these suspensions allow elastomers to be produced with good mechanical properties.

What is claimed is:

1. A process for preparing a suspension of a particulate filler in a material, wherein said material is prepared from a silicone oil comprising:

polyorganosiloxanes (POS fluids) of type (I) which carry Si-alkenyl functional groups capable of reacting with the Si—H crosslinking functional groups of a POS fluid of type II, optionally, POS fluids of type (II) which carry Si—H crosslinking functional groups capable of reacting with the Si-alkenyl functional groups of the POS fluids (I), and/or, optionally, POS fluids of type (III) which differ from the POS fluids (I) and (II), said suspension being able to be used for producing silicone compositions that can be cured by polyaddition, and wherein said particulate filler is treated with a compatibilizer;

said process comprising, forming a preparation mixture of the particulate filler and the silicone oil, and introducing compatibilizer into the preparation mixture either:

before and/or simultaneously with the contacting of at least part of the silicone oil employed with at least part of the particulate filler used, this introduction of compatibilizer taking place in one or more steps or, after the contacting of at least part of the silicone oil employed with at least part of the particulate filler used;

and wherein:

all or some of the silicone oil, water and all or some of the particulate filler are mixed with a first compatibilizer fraction of between 1 and 3% by dry weight with respect to the filler, a second compatibilizer fraction, representing between 10 and 15% by dry weight of filler, is incorporated into the mixture, optionally, the rest of the silicone oil and the rest of the are added, the mixture is allowed to react, the mixture is devolatilized, optionally, the devolatilized mixture is allowed to cool, and optionally, the suspension is completed with the rest of the silicone oil.

2. The process according to claim 1, wherein:

a mixture comprising the silicone oil, the water and the first compatibilizer fraction is homogenized, the particulate filler is gradually added to the mixture obtained, mixing is continued, the second compatibilizer fraction is gradually incorporated into the mixture obtained from the previous step, mixing is continued, and the mixture is devolatilized.

3. The process according to claim 1, wherein;

the silicone oil and the water are homogenized, the particulate filler and, at the same time, the first compatibilizer fraction are gradually incorporated into the mixture obtained from the previous step, mixing is continued, the second compatibilizer fraction is gradually incorporated into the mixture obtained from the previous step, mixing is continued, and the mixture is devolatilized.

4. The process according to claim 1, wherein:

the silicone oil is introduced, the particulate filler together with the first compatibilizer fraction and the water are gradually and simultaneously incorporated into the silicone oil, mixing is continued, the second compatibilizer fraction is gradually incorporated into the mixture obtained from the previous step, mixing is continued, and the mixture is devolatilized.

5. The process according to claim 1, wherein said particulate filler is silica.

* * * * *